US006887908B1

(12) United States Patent
Pruet

(10) Patent No.: US 6,887,908 B1
(45) Date of Patent: May 3, 2005

(54) TREATMENT OF REACTION WATER FROM A FISCHER-TROPSCH REACTOR

(75) Inventor: Randall B. Pruet, Rumbai (ID)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 10/879,474

(22) Filed: Jun. 28, 2004

(51) Int. Cl.$^7$ ............................ C07C 27/00; C02F 1/72; C02F 1/68

(52) U.S. Cl. .................. 518/700; 518/728; 210/758; 210/761

(58) Field of Search ................ 518/700, 728; 210/758, 761

(56) References Cited

U.S. PATENT DOCUMENTS

| | | |
|---|---|---|
| 3,966,633 A | 6/1976 | Friedman |
| 4,568,663 A | 2/1986 | Mauldin |
| 6,225,358 B1 | 5/2001 | Kennedy |
| 6,533,945 B2 | 3/2003 | Shah |

| | | |
|---|---|---|
| 2002/0006969 A1 | 1/2002 | O'Beck et al. |

FOREIGN PATENT DOCUMENTS

| | | |
|---|---|---|
| EP | 0609079 | 9/2001 |

OTHER PUBLICATIONS

Hazardous Waste Disposed by Thermal Oxidation, John Zink Company 2001.
U.S. Appl. No. 10/880,336, "Seperation of Water from Fischer–Tropsch Product", filed Jun. 28, 2004, inventor Randall B. Pruet.

*Primary Examiner*—J. Parsa
(74) *Attorney, Agent, or Firm*—Burns, Doane, Swecker & Mathis, L.L.P.

(57) ABSTRACT

An integrated Fischer-Tropsch process provides methods for recovering reaction water from a Fischer-Tropsch reactor with minimal adverse environmental effects and with reduced costs compared to traditional methods. Reaction water, preferably separated from an overhead stream from a Fischer-Tropsch reactor, is vaporized and contaminants are thermally oxidized while in the vapor state. The thermal oxidation also produces flue gases, which flue gases may be condensed to recover water.

20 Claims, 5 Drawing Sheets

TREATMENT OF REACTION WATER FROM A FISCHER-TROPSCH REACTOR

BACKGROUND OF THE INVENTION

1. Field of the Invention

The present invention relates to an energy efficient Fischer-Tropsch process. More specifically, the present invention relates to a Fischer-Tropsch process in which reaction water and other aqueous streams from a Fischer-Tropsch process are treated in a cost effective and energy efficient manner.

2. Description of the Related Art

Prior approaches degas, de-oil, and/or distill Fischer-Tropsch reaction water to partially remove dissolved and entrained contaminants. However, the resulting water product still contains lower molecular weight hydrocarbons and oxygenates. As oxygenates are known to cause corrosion, while hydrocarbons may cause foaming, the resulting water product is of little or no commercial value and requires further treatment before recovery or preparation for disposal. Thus, the water product is usually treated in expensive facilities in order to remove the contaminants. Typical treatment steps include alcohol stripping, anaerobic digestion, and biological oxidation. Such treatment steps serve to remove contaminants from the water product. Bio-treatment is costly, sensitive to operate, and generates solid wastes. Simple pH neutralization followed by offshore disposal requires regulatory variances, does not result in the recovery of any water, and requires large amounts of neutralization chemicals.

Methods for treating hydrocarbon synthesis wastewater are described in U.S. Pat. No. 3,966,633 and U.S. Patent Application 2002/0006969. Further, U.S. Pat. No. 6,225,358 discloses a method for producing heavier hydrocarbons from lighter hydrocarbons including converting synthesis gas into heavier hydrocarbons and removing contaminants from an aqueous byproduct stream. Contaminants are removed from the aqueous byproduct stream by concentrating the contaminants in a concentrator column and using the light hydrocarbons in a stripper column to remove the contaminants from the byproduct stream.

U.S. Pat. No. 6,533,945 provides a process wherein the wastewater of a hydrocarbon synthesis reactor, such as a Fischer-Tropsch reactor, is sent to a gasifier and subsequently reacted with steam and oxygen at high temperatures and pressures so as to produce synthesis gas.

Thermal oxidation, which converts harmful components to less polluting compounds, such as water vapor, carbon dioxide, and nitrogen oxides, offers the most widely proven solution to pollution from refinery, petrochemical, fine chemical, pharmaceutical, and other process industries. The use of thermal oxidizers to dispose of a wide variety of hazardous industrial wastes, especially tail gases containing a variety of sulfur compounds, is known. Descriptions of pollutant control processes can be found in *Hazardous Waste Disposal by Thermal Oxidation*, John Zink Company, 2001 and *Thermal Oxidizers*, Callidus Technologies, Inc.

What is needed is a method for treating reaction water and other aqueous streams from a Fischer-Tropsch process in an energy efficient manner with minimal adverse environmental effects and with reduced costs compared to traditional methods. Such a method would desirably allow the handling of the contaminants in an economical fashion, while even permitting the recovery of water useful for recycle to the process, as well as other uses.

SUMMARY OF INVENTION

Recognizing this need, the present invention provides an integrated method for treating reaction water and other aqueous streams from a Fischer-Tropsch process with reduced costs compared to traditional methods, in an energy efficient manner, and with minimal adverse environmental effects, as the method does not generate solid or liquid wastes. In particular, the present invention provides an integrated Fischer-Tropsch process which comprises recovering reaction water from a Fischer-Tropsch reactor, generally an overhead stream. The reaction water is indirectly heat exchanged using energy from the Fischer-Tropsch process to vaporize the reaction water, producing heat-exchanged reaction water. The heat-exchanged reaction water is then reacted in a thermal oxidizer, thereby removing the contaminants contained in the reaction water and producing a useful flue gas.

More specifically, recovering reaction water from a Fischer-Tropsch reactor may comprise recovering an overhead stream from a Fischer-Tropsch reactor, cooling the overhead stream to condense at least a portion thereof, producing a cooled overhead stream, and separating the cooled overhead stream into a tail gas fraction, a hydrocarbon condensate fraction, and reaction water. The reaction water is then passed to a thermal oxidizer, preferably after indirect heat exchange, to remove the remaining contaminants in the reaction water and create a flue gas.

Among other factors, the present invention is based upon the discovery that thermal oxidation of reaction water from a Fischer-Tropsch reactor can provide a method for treating the reaction water with minimal adverse environmental effects, handling the contaminants in an economical fashion, while the integration of the thermal oxidation into the Fischer-Tropsch process provides a method that is both energy efficient and has reduced costs compared to traditional methods.

DETAILED DESCRIPTION OF THE INVENTION

Figure 1:
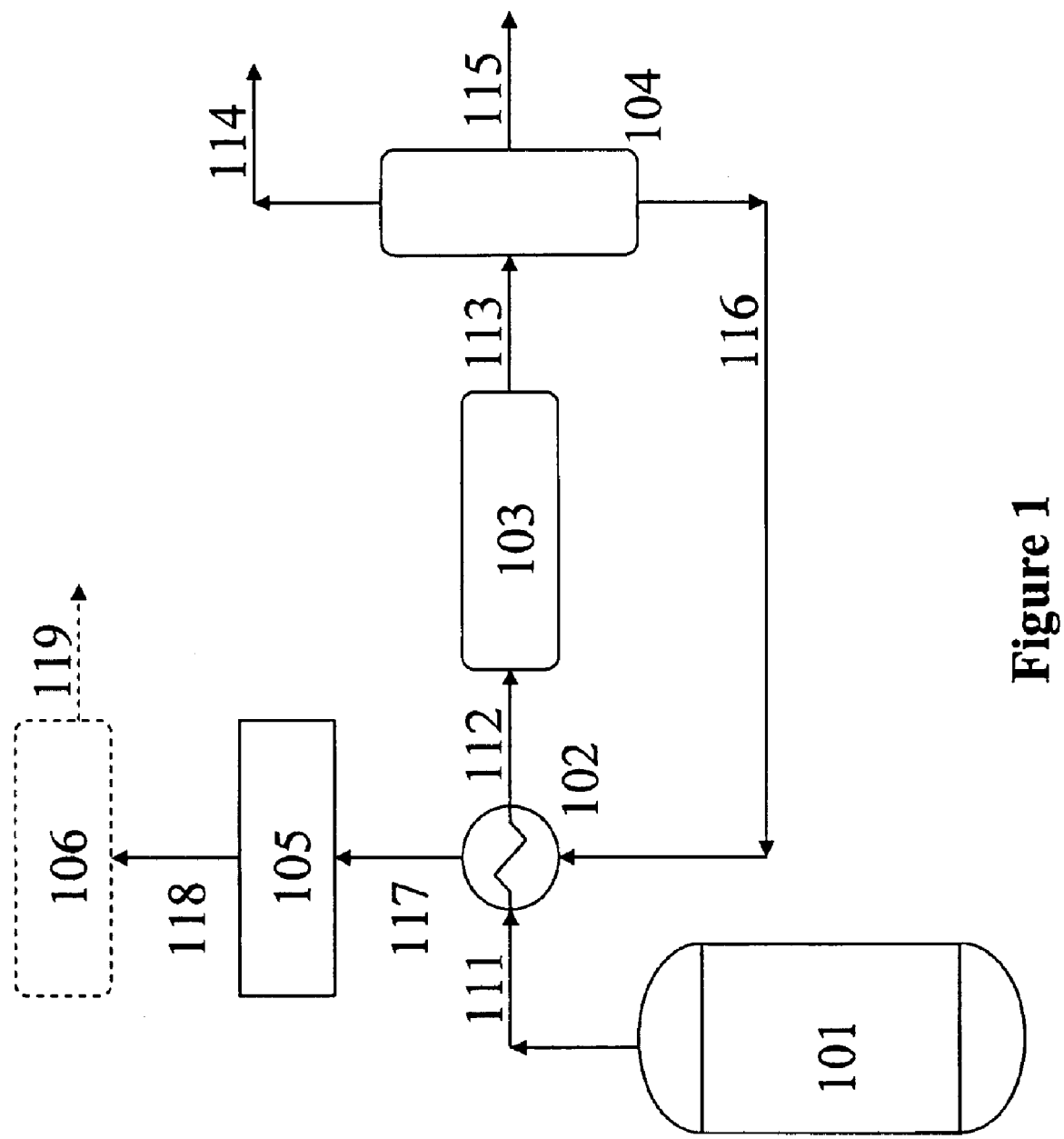
FIG. 1 illustrates an embodiment of the present invention wherein energy obtained by cooling an overhead stream from a Fischer-Tropsch reactor is used to indirectly heat exchange reaction water recovered from the overhead stream before reacting the heat-exchanged reaction water in a thermal oxidizer.

According to the present invention, water separated from a Fischer-Tropsch reaction product is vaporized, contaminants are thermally oxidized while in the vapor state, and flue gases may be condensed to recover water. The technique does not generate solid or liquid wastes.

The present invention provides methods of increased energy efficiency and cost effectiveness, as the energy required to vaporize the stream to be thermally oxidized is provided by earlier or later steps of the integrated process. Correspondingly, while some of the steps of the methods may be parallel to other steps of the method, the term "integrated," as used herein, means that certain steps of the method are interrelated or somehow dependent upon either earlier or later steps of the total method.

In Fischer-Tropsch chemistry, synthesis gas (syngas) is converted to liquid hydrocarbons by contact with a Fischer-Tropsch catalyst under reactive conditions. Typically, methane and optionally heavier hydrocarbons (ethane and heavier) can be sent through a conventional syngas generator to provide syngas. Generally, syngas contains hydrogen and carbon monoxide, and may include minor amounts of carbon dioxide and/or water. The presence of sulfur, nitrogen, halogen, selenium, phosphorus and arsenic contaminants in the syngas is undesirable. For this reason and depending on the quality of the syngas, it is preferred to remove sulfur and other contaminants from the feed before performing the Fischer-Tropsch chemistry. Means for removing these contaminants are well known to those of skill in the art. For example, ZnO guardbeds are preferred for removing sulfur impurities. Means for removing other contaminants are also well known to those of skill in the art. It also may be desirable to purify the syngas prior to the Fischer-Tropsch reactor to remove carbon dioxide produced during the syngas reaction and any additional sulfur compounds not already removed. This can be accomplished, for example, by contacting the syngas with a mildly alkaline solution (e.g., aqueous potassium carbonate) in a packed column.

In the Fischer-Tropsch process, contacting a synthesis gas comprising a mixture of $H_2$ and CO with a Fischer-Tropsch catalyst under suitable temperature and pressure reactive conditions forms liquid and gaseous hydrocarbons. The Fischer-Tropsch reaction is typically conducted at temperatures of about 300–700° F. (149–371° C.), preferably about 400–550° F. (204–228° C.); pressures of about 10–600 psia, (0.7–41 bars), preferably about 30–300 psia, (2–21 bars); and catalyst space velocities of about 100–10,000 cc/g/hr, preferably about 300–3,000 cc/g/hr. Examples of conditions for performing Fischer-Tropsch type reactions are well known to those of skill in the art.

The products of the Fischer-Tropsch synthesis process may range from $C_{1-200+}$ with a majority in the $C_{5-100+}$ range. The reaction can be conducted in a variety of reactor types, such as fixed bed reactors containing one or more catalyst beds, slurry reactors, fluidized bed reactors, or a combination of different type reactors. Such reaction processes and reactors are well known and documented in the literature.

The slurry Fischer-Tropsch process utilizes superior heat (and mass) transfer characteristics for the strongly exothermic synthesis reaction and is able to produce relatively high molecular weight, paraffinic hydrocarbons when using a cobalt catalyst. In the slurry process, a syngas comprising a mixture of hydrogen and carbon monoxide is bubbled up as a third phase through a slurry which comprises a particulate Fischer-Tropsch type hydrocarbon synthesis catalyst dispersed and suspended in a slurry liquid comprising hydrocarbon products of the synthesis reaction which are liquid under the reaction conditions. The mole ratio of the hydrogen to the carbon monoxide may broadly range from about 0.5 to about 4, but is more typically within the range of from about 0.7 to about 2.75 and preferably from about 0.7 to about 2.5. A particularly preferred Fischer-Tropsch process is taught in EP0609079.

In general, Fischer-Tropsch catalysts contain a Group VIII transition metal on a metal oxide support. The catalysts may also contain a noble metal promoter(s) and/or crystalline molecular sieves. Suitable Fischer-Tropsch catalysts comprise one or more of Fe, Ni, Co, Ru and Re, with cobalt being preferred. A preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Suitable support materials include alumina, silica, magnesia and titania or mixtures thereof. Preferred supports for cobalt containing catalysts comprise titania. Useful catalysts and their preparation are known and illustrated in U.S. Pat. No. 4,568,663, which is intended to be illustrative but non-limiting relative to catalyst selection.

Certain catalysts are known to provide chain growth probabilities that are relatively low to moderate, and the reaction products include a relatively high proportion of low molecular ($C_{2-8}$) weight olefins and a relatively low proportion of high molecular weight ($C_{30+}$) waxes. Certain other catalysts are known to provide relatively high chain growth probabilities, and the reaction products include a relatively low proportion of low molecular ($C_{2-8}$) weight olefins and a relatively high proportion of high molecular weight ($C_{30}+$) waxes. Such catalysts are well known to those of skill in the art and can be readily obtained and/or prepared.

The product from a Fischer-Tropsch process contains predominantly paraffins. The products from Fischer-Tropsch reactions generally include a light reaction product and a waxy reaction product. The light reaction product (i.e., the condensate fraction) includes hydrocarbons boiling below about 700° F. (e.g., tail gases through middle distillate fuels), largely in the $C_{5-20}$ range, with decreasing amounts up to about $C_{30}$. The waxy reaction product (i.e., the wax fraction) includes hydrocarbons boiling above about 600° F. (e.g., vacuum gas oil through heavy paraffins), largely in the $C_{20+}$ range, with decreasing amounts down to $C_{10-}$.

Both the light reaction product and the waxy product are substantially paraffinic. The waxy product generally comprises greater than 70 weight % normal paraffins, and often greater than 80 weight % normal paraffins. The light reaction product comprises paraffinic products with a significant proportion of alcohols and olefins. In some cases, the light reaction product may comprise as much as 50 weight %, and even higher, alcohols and olefins. It is the light reaction product (i.e., the overhead stream) that is preferably used in the integrated method of the present invention. The present method can be used in connection with any effluent stream recovered from a Fischer-Tropsch reactor that contains water. Application to the overhead stream is, however, most practical and rewarding.

The overhead stream from the Fischer-Tropsch reactor is generally separated into a tail gas fraction, a hydrocarbon condensate fraction, and reaction water using a three-phase separator. The tail gas fraction comprises $H_2$, CO, $CO_2$, and $C_{1-2}$ products, the hydrocarbon condensate fraction comprises $C_{3-20}$ products, and the reaction water possibly comprises minor amounts of impurities such as hydrocarbons, alcohols, acids, oxygenates, nitrogen compounds, and/or sulfur compounds.

Prior to thermal oxidation, the reaction water is preferably vaporized. A major advantage of the present method is that the vaporization is integrated into the overall process, as the energy required for vaporization may be obtained from the Fischer-Tropsch process by cooling the overhead stream from the Fischer-Tropsch reactor or by cooling the Fischer-Tropsch reactor itself. More specifically, the reaction water to be vaporized may be passed through a heat exchanger in which the reaction water indirectly contacts the overhead stream from the Fischer-Tropsch reactor, which is resultantly cooled. Additionally, the Fischer-Tropsch reactor may contain cooling coils, which serve to remove heat generated during the highly exothermic Fischer-Tropsch reaction. The reaction water to be vaporized may be used in the cooling coils, to simultaneously remove heat from the Fischer-Tropsch reactor and vaporize the reaction water. Alternatively, the reaction water to be vaporized may be passed through a heat exchanger in which the reaction water indirectly contacts steam removed from the cooling coils, which is resultantly cooled.

According to the present invention, thermal oxidation is integrated into the Fischer-Tropsch process, or stated otherwise, a part of the Fischer-Tropsch process. Thus, after the reaction water has been vaporized, it is reacted in a thermal oxidizer operated at high temperatures and low pressures. The prior vaporization of the reaction water allows the thermal oxidation to operate in a more energy efficient manner. Contaminants are oxidized and the reaction water is converted into flue gas containing water vapor, carbon dioxide, and nitrogen oxides. The reaction zone of the thermal oxidizer should be maintained at a suitably high temperature for a sufficient period of time to allow the reactants to oxidize to a point that 99.99% of the reactants are converted. Ordinarily, the flue gas from a thermal oxidizer may be used to produce or superheat steam, or simply be exhausted to the air. In addition, the thermal oxidizer products (e.g., water, carbon dioxide, and nitrogen oxides) may be captured, isolated, and sequestered, if desired, using a variety of technologies known to those of skill in the art.

Thermal oxidizers as disclosed by the present invention are commercially available from such companies as CB&I Callidus, Hamworthy Combustion Engineering Ltd., and John Zink Company, LLC. Meeting CO and unburned hydrocarbon emission regulations from thermal oxidizers is accomplished by the correct selection of thermal oxidizer resident time, operating temperature, and turbulence; CO and hydrocarbon destruction efficiency increase as residence time and operating temperature increase. Operating conditions for thermal oxidizers vary according to emission regulations and the waste stream being converted. Operating conditions may vary over a wide range such as 20–100 MM BTU/hr burner, 60,000–135,000 lbs/hr flow, 850–40,000 kg/hr waste flow, 0.6–2 second residence time, 550–2200° F. operating temperature, and destruction efficiencies of up to 99.9999%.

In another example of integration, the energy required for vaporization of the reaction water prior to thermal oxidation may be obtained from the thermal oxidation by passing the reaction water to be vaporized through a heat exchanger in which the reaction water indirectly contacts at least a portion of the flue gas from the thermal oxidizer, which is resultantly cooled. Moreover, at least a portion of the flue gas may be used in steam reforming of methane to form syngas, to be fed to the Fischer-Tropsch reactor.

After thermal oxidation, at least a portion of the flue gas from the thermal oxidizer may be condensed to provide water. At least a portion of such water may be recovered for further use, and specifically may be recycled to the Fischer-Tropsch process for further use, such as in reactor cooling, and more specifically for use in cooling coils. Condensed water from a thermal oxidizer is generally devoid of dissolved minerals and therefore is a superior feedstock for systems that require low mineral content.

In a specific embodiment, at least a portion of the flue gas from the thermal oxidizer may be fed to a direct contacting cooler containing a water spray. The water spray serves to knock a water product out of the flue gas and allows a vapor product comprising $CO_2$ and $N_2$ to be exhausted out of the direct contacting cooler. The water product is recovered and at least a portion of the water product may be passed to the water spray in the direct contacting cooler.

The invention will be further explained by reference to the Figures of the Drawing, which illustrations are intended to be non-limiting and merely illustrative. Referring to the Figures, according to FIG. 1, an overhead stream 111 is recovered from a Fischer-Tropsch reactor 101. The overhead stream 111 is cooled by sending it through a heat exchanger 102.

The cooled overhead stream 112 is further cooled in a condenser 103. The further cooled overhead stream 113 is separated in a three-phase separator 104 into a tail gas fraction 114, a hydrocarbon condensate fraction 115, and reaction water 116. The reaction water 116 is vaporized in the heat exchanger 102 by indirectly contacting the reaction water with the overhead stream 111. The vaporized reaction water 117 is then reacted in a thermal oxidizer 105, producing flue gas 118. The flue gas 118 may then be passed to a condenser 106 to provide water 119. Use of the heat exchanger 102 allows for the condenser 103 to have a smaller cooling requirement than would be necessary without the heat exchanger 102.

Figure 2:
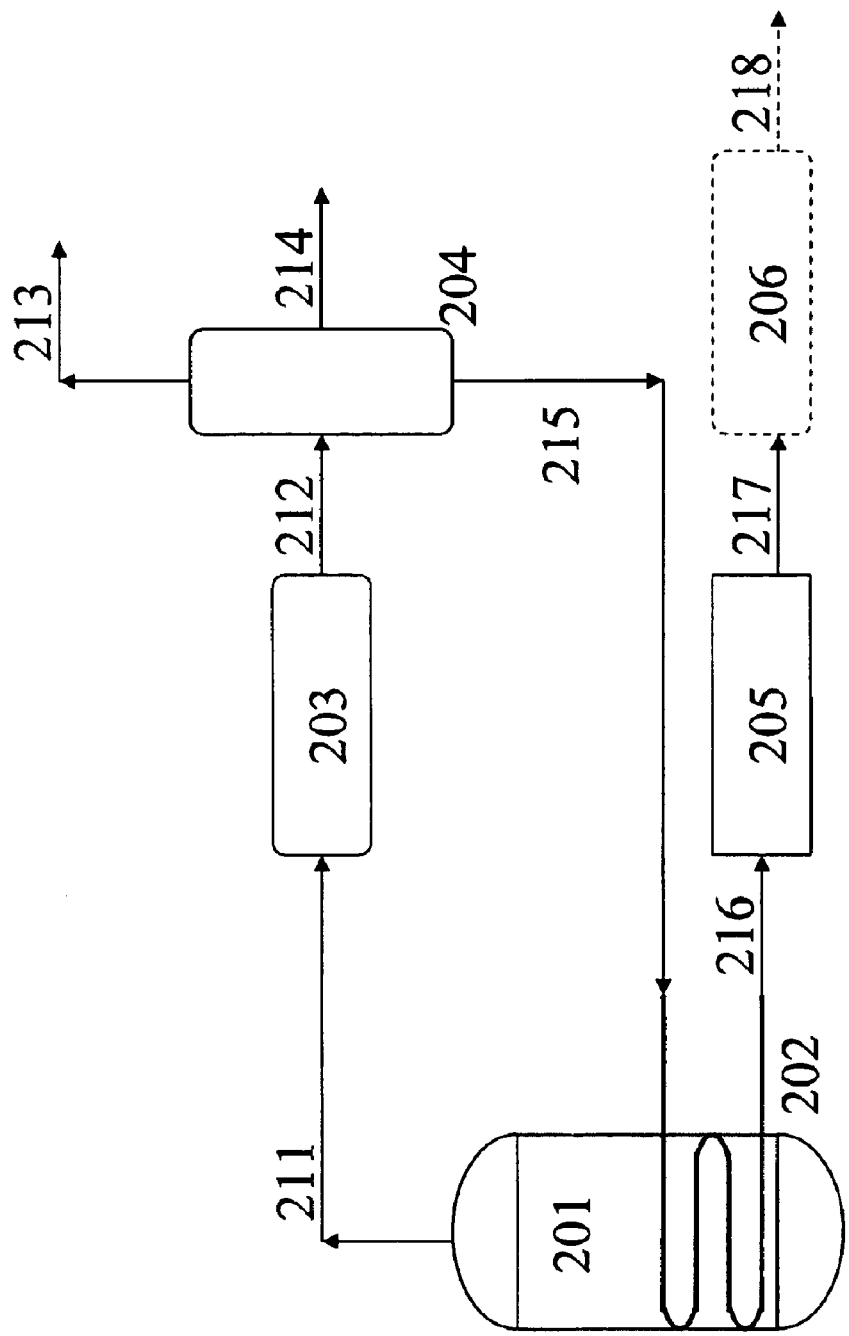
FIG. 2 illustrates an embodiment of the present invention wherein energy obtained by cooling a Fischer-Tropsch reactor using cooling coils is used to indirectly heat exchange reaction water recovered from an overhead stream from the Fischer-Tropsch reactor before reacting the heat-exchanged reaction water in a thermal oxidizer.

According to FIG. 2, an overhead stream 211 is recovered from a Fischer-Tropsch reactor 201 containing cooling coils 202. The cooling coils 202 serve to remove heat generated during the highly exothermic Fischer-Tropsch reaction. The overhead stream 211 is cooled in a condenser 203. The cooled overhead stream 212 is separated in a three-phase separator 204 into a tail gas fraction 213, a hydrocarbon condensate fraction 214, and reaction water 215. The reaction water 215 is vaporized by feeding the reaction water 215 into the cooling coils 202 of the Fischer-Tropsch reactor 201. The vaporized reaction water 216 is then reacted in a thermal oxidizer 205, producing flue gas 217. The flue gas 217 may then be passed to a condenser 206 to provide water 218. Thus, heat generated during the Fischer-Tropsch reaction serves to vaporize the water stream 215 reacted in the thermal oxidizer 205.

Figure 3:
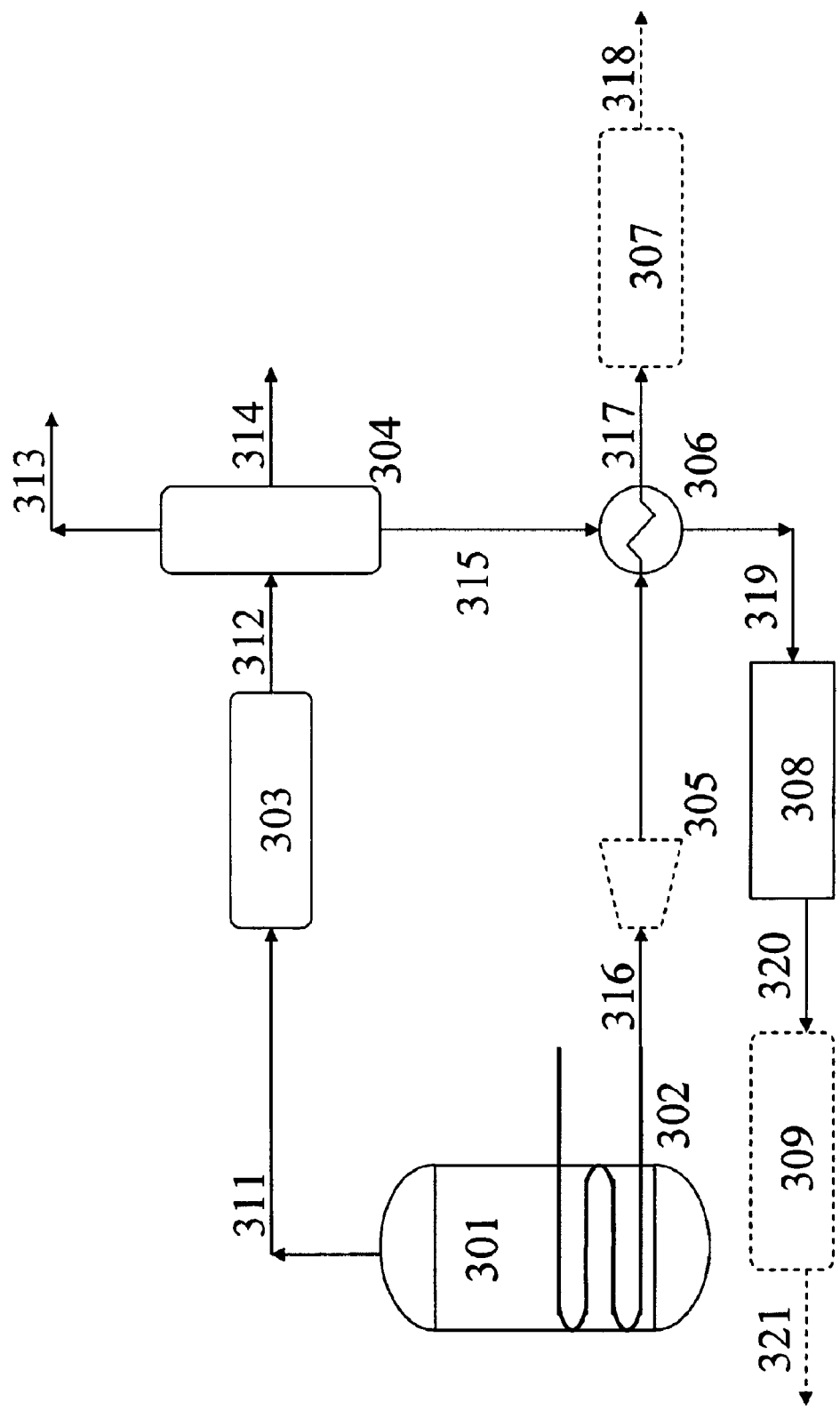
FIG. 3 illustrates an embodiment of the present invention wherein energy obtained by cooling steam generated in cooling coils used to cool a Fischer-Tropsch reactor is used to indirectly heat exchange reaction water recovered from an overhead stream from the Fischer-Tropsch reactor before reacting the heat-exchanged reaction water in a thermal oxidizer.

According to FIG. 3, an overhead stream 311 is recovered from a Fischer-Tropsch reactor 301 containing cooling coils 302. The cooling coils 302 serve to remove heat generated during the highly exothermic Fischer-Tropsch reaction. The overhead stream 311 is cooled in a condenser 303. The cooled overhead stream 312 is separated in a three-phase separator 304 into a tail gas fraction 313, a hydrocarbon condensate fraction 314, and reaction water 315. Optionally, the steam 316 generated in the cooling coils 302 may be passed through a turbine 305, thereby generating power, prior to vaporizing the reaction water 315 in a heat exchanger 306 by indirectly contacting the reaction water 315 with steam 316 generated in cooling coils 302 of the Fischer-Tropsch reactor 301. Additionally, the cooled steam 317 may be passed to a condenser 307 to provide a water stream 318. The vaporized reaction water 319 is then reacted in a thermal oxidizer 308, producing flue gas 320. The flue gas 320 may then be passed to a condenser 309 to provide water 321. Thus, heat generated during the Fischer-Tropsch reaction is used to vaporize the water stream 315 reacted in the thermal oxidizer 308.

Figure 4:
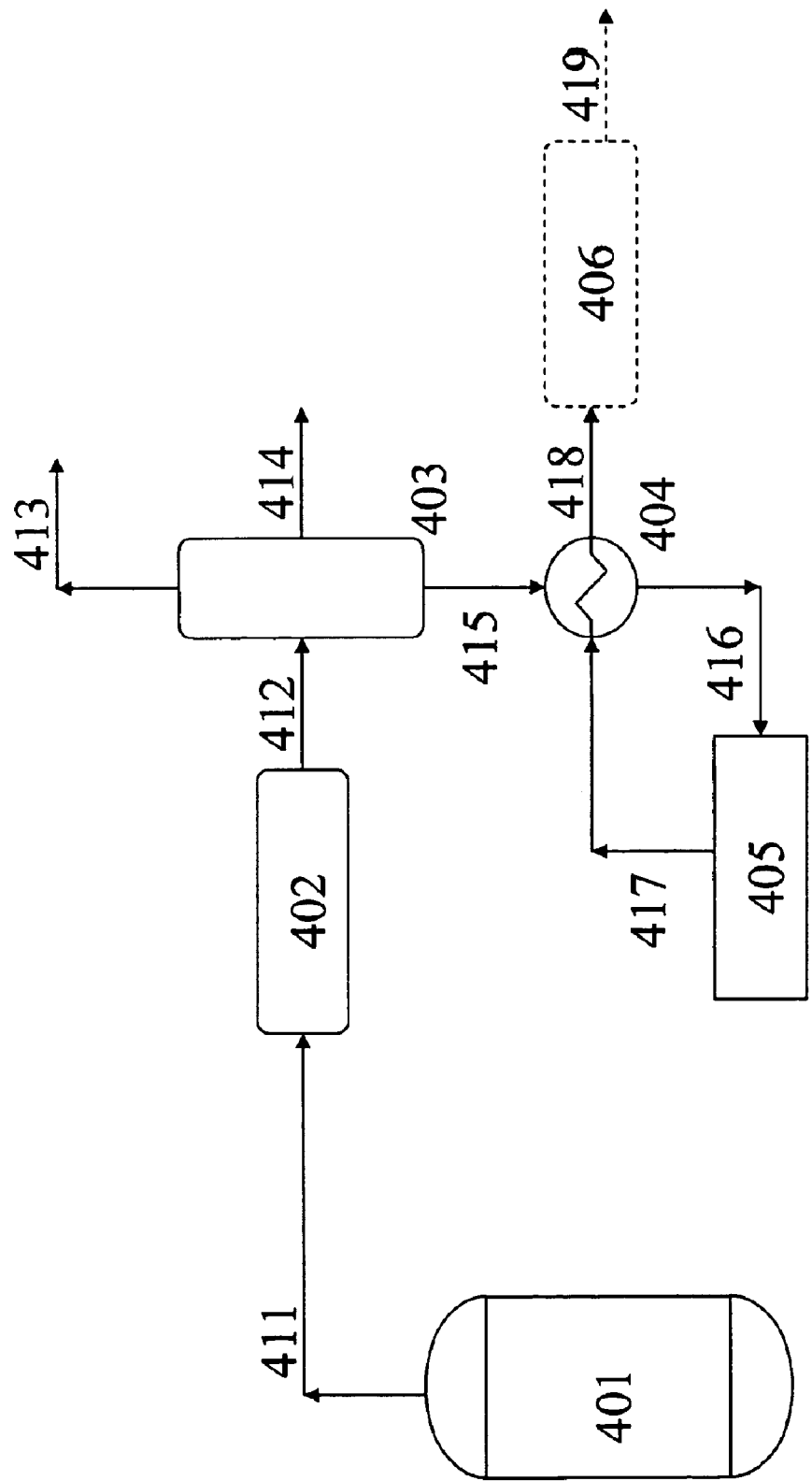
FIG. 4 illustrates an embodiment of the present invention wherein energy obtained by cooling flue gas produced in a thermal oxidizer is used to indirectly heat exchange reaction water recovered from an overhead stream from a Fischer-Tropsch reactor before reacting the heat-exchanged reaction water in the thermal oxidizer.

According to FIG. 4, an overhead stream 411 is recovered from a Fischer-Tropsch reactor 401. The overhead stream 411 is cooled in a condenser 402. The cooled overhead stream 412 is separated in a three-phase separator 403 into a tail gas fraction 413, a hydrocarbon condensate fraction 414, and reaction water 415. The reaction water 415 is vaporized in a heat exchanger 404 to produce a vaporized reaction water 416 by indirectly contacting the reaction water 415 with flue gas 417 from a thermal oxidizer 405. The vaporized reaction water 416 is then reacted in the thermal oxidizer 405. The cooled flue gas 418 may then be passed to a condenser 406 to provide water 419.

Figure 5:
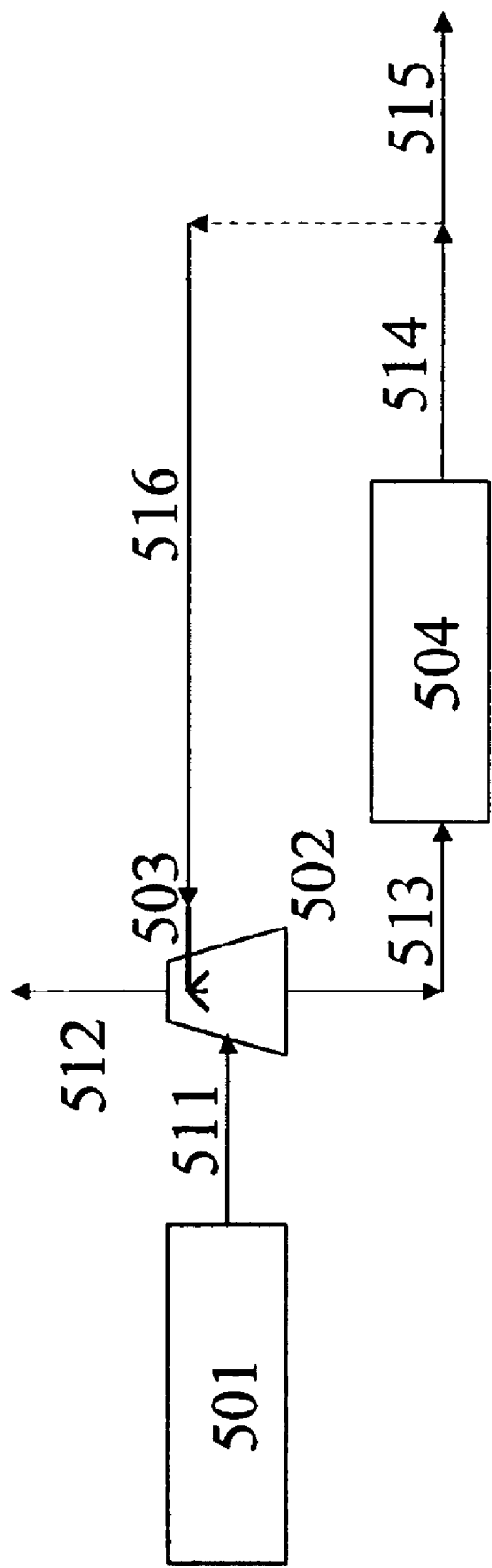
FIG. 5 illustrates a method for condensing the flue gas produced in the thermal oxidizer to provide water.

FIG. 5 illustrates a system that may serve as the condenser disclosed in FIGS. 1–4. Accordingly, the flue gas 511 from the thermal oxidizer 501 is fed to a direct contacting cooler 502 containing a water spray 503. A vapor product 512 is exhausted out of the direct contacting cooler 502 and a water product 513 is knocked out of the flue gas 511. The water product 513 is cooled in a heat exchanger 504. At least a portion of the cooled water 514 is recovered 515 and at least a portion of the cooled water 514 may be passed 516 to the water spray 503 in the direct contacting cooler 502.

As can be seen from the foregoing, the present method allows for the treatment of reaction water from a Fischer-Tropsch reactor in an energy efficient manner with minimal adverse environmental effects, and with overall reduced costs compared to traditional methods. The present method allows the handling of contaminants in an economical fashion, while also permitting the recovery of a useful water product.

While the devices, compositions and methods of this invention have been described in terms of preferred embodiments, it will be apparent to those of skill in the art that variations may be applied to the process described herein without departing from the concept and scope of the invention. All such similar substitutes and modifications apparent to those of skill in the art are deemed to be within the scope and concept of the invention as it is set out in the following claims.

What is claimed is:

1. A Fischer-Tropsch process which comprises:
    a) recovering reaction water from a stream from a Fischer-Tropsch reactor;
    b) indirectly heat exchanging the reaction water using energy from the Fischer-Tropsch process to vaporize the reaction water, producing a heat-exchanged reaction water; and
    c) reacting the heat-exchanged reaction water in a thermal oxidizer, producing flue gas.

2. The Fischer-Tropsch process of claim 1, wherein the stream from which the reaction water is recovered is a Fischer-Tropsch overhead stream.

3. The Fischer-Tropsch process of claim 1, wherein the reaction water comprises impurities selected from the group consisting of hydrocarbons, alcohols, acids, oxygenates, nitrogen compounds, sulfur compounds, and combinations thereof.

4. The Fischer-Tropsch process of claim 1, wherein recovering reaction water from an overhead stream from a Fischer-Tropsch reactor comprises:
    i) recovering an overhead stream from a Fischer-Tropsch reactor;
    ii) cooling the overhead stream to condense at least a portion thereof, producing a cooled overhead stream; and
    iii) separating the cooled overhead stream into a tail gas fraction, a hydrocarbon condensate fraction, and reaction water.

5. The Fischer-Tropsch process of claim 1, wherein the energy from the Fischer-Tropsch process is obtained by cooling the overhead stream.

6. The Fischer-Tropsch process of claim 1, wherein the energy from the Fischer-Tropsch process is obtained by cooling the Fischer-Tropsch reactor.

7. The Fischer-Tropsch process of claim 6, wherein the Fischer-Tropsch reactor is cooled using cooling coils.

8. The Fischer-Tropsch process of claim 7, wherein the energy from the Fischer-Tropsch process is obtained by cooling steam generated in the cooling coils.

9. The Fischer-Tropsch process of claim 8, further comprising generating power by passing the steam through a turbine before cooling the steam.

10. The Fischer-Tropsch process of claim 8, further comprising using at least a portion of the steam in steam reforming of methane to form syngas, to be fed to the Fischer-Tropsch reactor.

11. The Fischer-Tropsch process of claim 8, further comprising condensing at least a portion of the steam, providing water.

12. The Fischer-Tropsch process of claim 11, further comprising recycling at least a portion of the water to the Fischer-Tropsch process for further use.

13. The Fischer-Tropsch process of claim 1, wherein the energy from the Fischer-Tropsch process is obtained by cooling the flue gas.

14. The Fischer-Tropsch process of claim 1, further comprising condensing at least a portion of the flue gas, providing water.

15. The Fischer-Tropsch process of claim 14, wherein condensing at least a portion of the flue gas comprises:
    i) passing at least a portion of the flue gas to a direct contacting cooler comprising a water spray; and
    ii) recovering from the direct contacting cooler a vapor product and water.

16. The Fischer-Tropsch process of claim 15, further comprising passing at least a portion of the water to the water spray.

17. The Fischer-Tropsch process of claim 14, further comprising recovering at least a portion of the water for further use.

18. The Fischer-Tropsch process of claim 17, wherein the further use comprises reactor cooling.

19. The Fischer-Tropsch process of claim 18, wherein at least a portion of the water is used in cooling coils.

20. The process of claim 1, further comprising using at least a portion of the flue gas in steam reforming of methane to form syngas, to be fed to the Fischer-Tropsch reactor.

* * * * *